United States Patent
Fang et al.

(10) Patent No.: US 12,351,440 B1
(45) Date of Patent: Jul. 8, 2025

(54) PATH PLANNING METHOD OF HANDLING DEVICE, HANDLING DEVICE AND ELECTRONIC DEVICE

(71) Applicant: VisionNav Robotics USA Inc., Acworth, GA (US)

(72) Inventors: Mu Fang, Acworth, GA (US); Bingchuan Yang, Acworth, GA (US); Yujie Lu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/069,866

(22) Filed: Mar. 4, 2025

Related U.S. Application Data

(63) Continuation of application No. PCT/IB2024/062611, filed on Dec. 13, 2024.

(30) Foreign Application Priority Data

Jan. 4, 2024 (CN) .......................... 202410012619.8

(51) Int. Cl.
*B66F 9/06* (2006.01)
*B65G 67/04* (2006.01)
(Continued)

(52) U.S. Cl.
CPC .............. *B66F 9/063* (2013.01); *B65G 67/04* (2013.01); *B66F 9/0755* (2013.01); *G05D 1/225* (2024.01);
(Continued)

(58) Field of Classification Search
CPC ........ B66F 9/063; B66F 9/0755; B65G 67/04; B65G 2814/0302; G05D 1/225;
(Continued)

(56) References Cited

U.S. PATENT DOCUMENTS

| 5,409,346 | A | * | 4/1995 | Grether | ..................... B66F 9/06 414/673 |
| 5,641,261 | A | * | 6/1997 | Talbert | ................ B66F 9/07563 414/664 |

(Continued)

FOREIGN PATENT DOCUMENTS

| CN | 108932597 A | 12/2018 |
| CN | 110356760 A | 10/2019 |

(Continued)

OTHER PUBLICATIONS

CN202410012619.8—First Office Action mailed on Feb. 9, 2024, 21 pages.

(Continued)

*Primary Examiner* — Russell Frejd
(74) *Attorney, Agent, or Firm* — Getech Law LLC; Jun Ye

(57) ABSTRACT

Provided is a path planning method of a handling device, a handling device, and an electronic device. The method includes: based on position information of a target goods placement area in a truck bed and an initial position, determining a handling path corresponding to the target goods placement area, where the handling path includes a first handling path including a turn-around position and a loading-unloading position corresponding to the target goods placement area; sending the handling path to a target handling device such that the target handling device, based on the first handling path, travels to the turn-around position in a forward mode, and rotates at the turn-around position to enable a bearing assembly of the rotated target handling device to face toward the target goods placement area, and then travels, in a backward mode, to the loading-unloading position to perform goods loading or unloading operations.

20 Claims, 7 Drawing Sheets

(51) Int. Cl.
*B66F 9/075* (2006.01)
*G05D 1/225* (2024.01)
*G05D 107/70* (2024.01)
*G06T 7/60* (2017.01)
*G06T 7/73* (2017.01)

(52) U.S. Cl.
CPC .................. *G06T 7/60* (2013.01); *G06T 7/73* (2017.01); *B65G 2814/0302* (2013.01); *G05D 2107/70* (2024.01); *G06T 2207/10028* (2013.01); *G06T 2207/30252* (2013.01)

(58) Field of Classification Search
CPC ......... G05D 2107/70; G06T 7/60; G06T 7/73; G06T 2207/10028; G06T 2207/30252
See application file for complete search history.

(56) References Cited

U.S. PATENT DOCUMENTS

| | | | | |
|---|---|---|---|---|
| 5,813,814 | A * | 9/1998 | Smart | A01D 90/08 414/789.7 |
| 6,247,885 | B1 * | 6/2001 | Smart | A01D 90/08 414/789.7 |
| 7,540,701 | B2 * | 6/2009 | Maehara | B65D 88/60 414/510 |
| 2007/0239312 | A1 * | 10/2007 | Andersen | B66F 9/065 700/213 |
| 2018/0195246 | A1 * | 7/2018 | Hanssen | G08B 5/006 |
| 2021/0370989 | A1 | 12/2021 | Morimura | |
| 2022/0219902 | A1 * | 7/2022 | Zheng | G05D 1/0246 |
| 2023/0144047 | A1 * | 5/2023 | Fanning | B66F 9/20 414/467 |

FOREIGN PATENT DOCUMENTS

| | | |
|---|---|---|
| CN | 112239037 A | 1/2021 |
| CN | 112551015 A | 3/2021 |
| CN | 113532443 A | 10/2021 |
| CN | 114930263 A | 8/2022 |
| CN | 115951688 A | 4/2023 |
| CN | 116425088 A | 7/2023 |

OTHER PUBLICATIONS

CN202410012619.8—Notification to Grant Patent Right for Invention mailed on Apr. 5, 2024, 3 pages.
CN202410012619.8—Second Office Action mailed on Mar. 20, 2024, 22 pages.
PCT/182024/062611—International Search Report and Written Opinion mailed on Feb. 18. 2025, 20 pages.

* cited by examiner

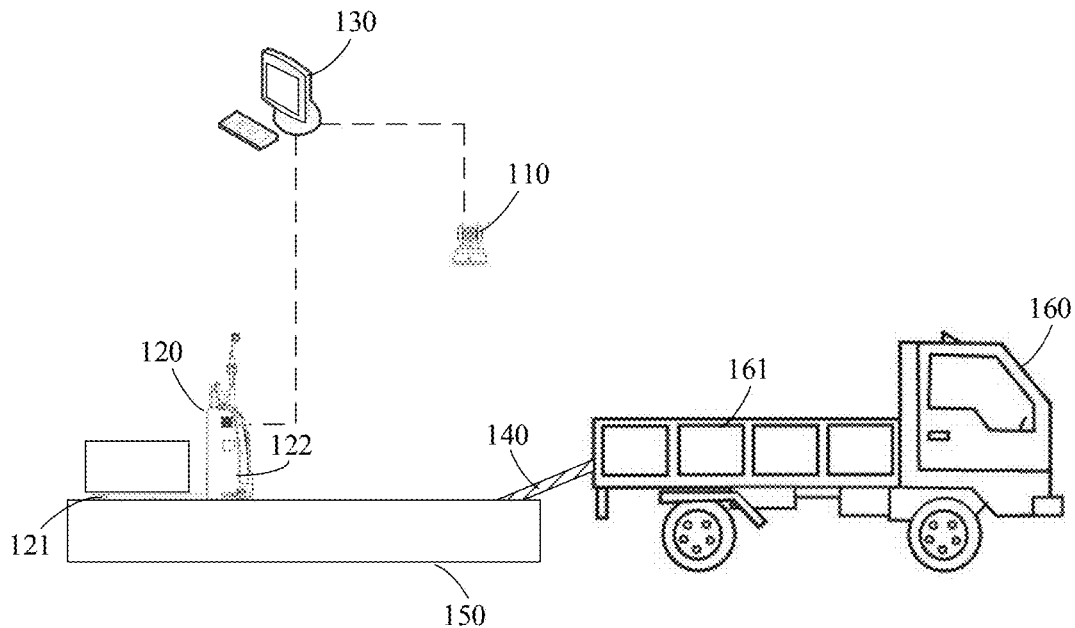

FIG. 1

202
Determine, based on position information of a target goods placement area in a truck bed and an initial position, a handling path corresponding to the target goods placement area, where the handling path includes a first handling path including a turn-around position and a loading-unloading position corresponding to the target goods placement area 204
Send the handling path to the target handling device, such that the target handling device, based on the first handling path, travels to the turn-around position in the forward mode and rotates upon reaching the turn-around position to enable the bearing assembly of the rotated target handling device to face toward the target goods placement area, and then travels in the backward mode to the loading-unloading position corresponding to the target goods placement area to perform goods loading or unloading operations

FIG. 2

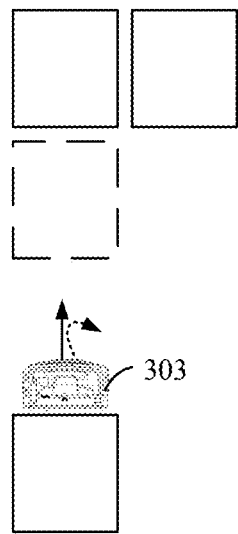
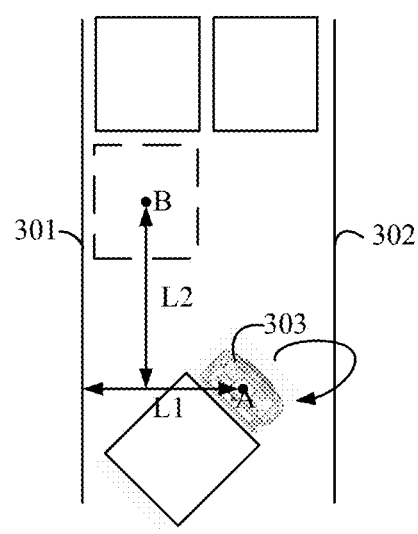
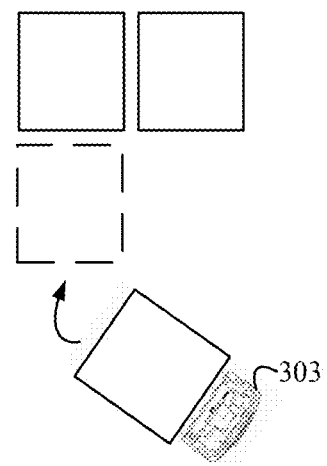
FIG. 3A　　　　　　FIG. 3B　　　　　　FIG. 3C
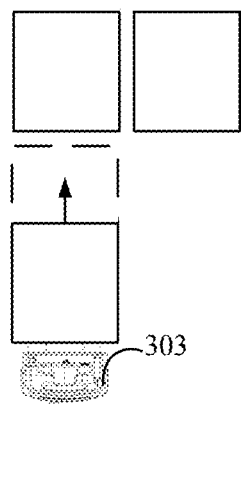
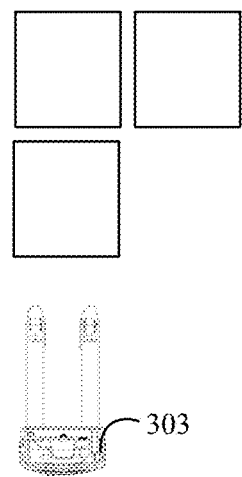
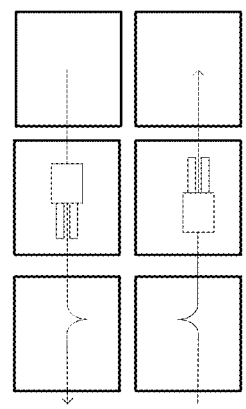
FIG. 3D　　　　　　FIG. 3E　　　　　　FIG. 4A
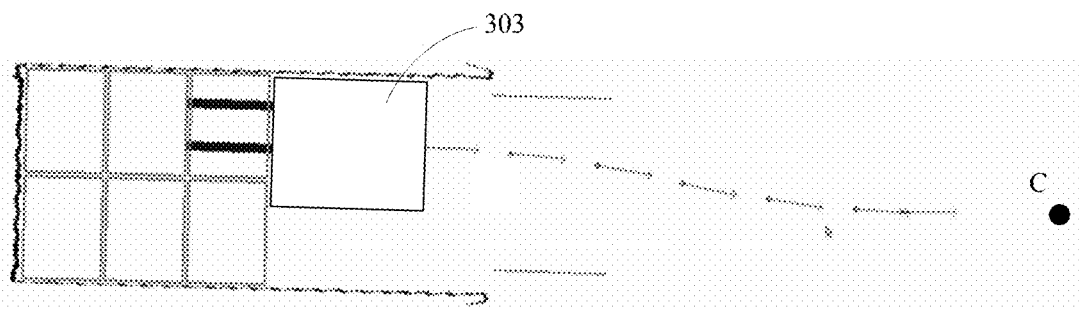
FIG. 4B

PATH PLANNING METHOD OF HANDLING DEVICE, HANDLING DEVICE AND ELECTRONIC DEVICE

CROSS REFERENCE TO RELATED APPLICATIONS

This application is a continuation of International Application No. PCT/IB2024/062611, filed on Dec. 13, 2024, which claims priority to Chinese Patent Application No. 202410012619.8 filed on Jan. 4, 2024, the entire content of which is incorporated herein by reference.

TECHNICAL FIELD

The present disclosure relates to the field of smart warehousing technologies and in particular to a path planning method of a handling device, a handling device and an electronic device.

BACKGROUND

In the warehousing logistics, it is required to handle goods from the bed of a truck to a designated area for storage or handle goods from a designated area to the bed of a truck, thereby realizing goods transfer.

SUMMARY

Embodiments of the present disclosure provide a path planning method of a handling device, a handling device, and an electronic device, so as to load or unload goods by the handling device onto or from a truck bed, thereby improving the loading or unloading efficiency of the truck bed.

An embodiment of the present disclosure provides a path planning method of a handling device. The method includes: based on position information of a target goods placement area in a truck bed and an initial position, determining a handling path corresponding to the target goods placement area, where the handling path includes a first handling path, and the first handling path includes a turn-around position and a loading-unloading position corresponding to the target goods placement area; sending the handling path to a target handling device, such that the target handling device, based on the first handling path travels to the turn-around position in a forward mode, and rotates at the turn-around position to enable a bearing assembly of the rotated target handling device to face toward the target goods placement area, and then travels, in a backward mode, to the loading-unloading position to perform goods loading or unloading operations; where a travel direction of the backward mode is a direction that a device body of the target handling device points to the bearing assembly of the target handling device, and a travel direction of the forward mode is opposite to the travel direction of the backward mode.

An embodiment of the present disclosure provides a handling device, which includes a bearing assembly, a device body and a controller. One end of the bearing assembly is connected with the device body, and the other end of the bearing assembly extends away from the device body. The controller is configured to: receive a handling path. The handling path includes a first handling path, and the first handling path includes a turn-around position and a loading-unloading position corresponding to a target goods placement area in a truck bed. After receiving the handling path, the controller is further configured to: based on the first handling path control the handling device to travel to the turn-around position in a forward mode, rotate at the turn-around position to enable the bearing assembly of the rotated target handling device to face toward the target goods placement area, and then control the handling device to travel, in a backward mode, to the loading-unloading position to perform goods loading or unloading operations; where a travel direction of the backward mode is a direction that the device body points to the bearing assembly, and a travel direction of the forward mode is opposite to the travel direction of the backward mode.

An embodiment of the present disclosure provides an electronic device, including a memory and a processor. The memory stores computer programs and the computer programs are executed by the processor to perform any one of the path planning methods of the handling device disclosed in the embodiments of the present disclosure.

Compared with related arts, the embodiments of the present disclosure have the following beneficial effects.

The embodiments of the present disclosure provide a path planning method a handling device, a handling device and an electronic device. The method may include: based on position information of a target goods placement area in a truck bed and an initial position, determining a handling path corresponding to the target goods placement area, where the handling path includes a first handling path, and the first handling path includes a turn-around position and a loading-unloading position corresponding to the target goods placement area; sending the handling path to a target handling device, such that the target handling device, based on the first handling path, travels to the turn-around position in a forward mode, and rotates at the turn-around position to enable a bearing assembly of the rotated target handling device to face toward the target goods placement area, and then travels, in a backward mode, to the loading-unloading position to perform goods loading or unloading operations; where a travel direction of the backward mode is a direction that a device body of the target handling device points to the bearing assembly of the target handling device, and a travel direction of the forward mode is opposite to the travel direction of the backward mode. In the embodiments of the present disclosure, loading or unloading operations are performed by the handling device in the truck bed, such that the target handling device, based on the first handling path, can rotate in the truck bed when traveling toward the loading-unloading position, and can directly pick up or unload goods upon traveling to the loading-unloading position, without adjusting the position of the bearing assembly by a lateral movable component, thereby improving the loading or unloading efficiency of the handling device in the truck bed. Due to small rotation radius of the handling device, the handling device can smoothly perform direction-changing operation in the truck bed without collision with the truck bed. Furthermore, due to small device body of the handling device, the handling device will not crush a boarding bridge or truck bed floor, and no renovation is required for the boarding bridge, leading to wide application scope and high reliability.

BRIEF DESCRIPTION OF DRAWINGS

In order to more clearly describe the technical solutions of the embodiments of the present disclosure, the drawings required for descriptions of the embodiments will be briefly introduced. Apparently, the drawings described hereunder are only some embodiments of the present disclosure. Persons of ordinary skill in the arts can also obtain other drawings based on these drawings without carrying out creative work.

FIG. 1 is a schematic diagram illustrating an application scenario of a path planning method of a handling device according to embodiments of the present disclosure.

FIG. 2 is a schematic flowchart illustrating a path planning method of a handling device according to embodiments of the present disclosure.

FIG. 3A to FIG. 3E are schematic diagrams illustrating a travel process of a target handling device according to embodiments of the present disclosure.

FIG. 4A is a path diagram illustrating a handling path planned by an electronic device according to embodiments of the present disclosure.

FIG. 4B is a schematic diagram illustrating a target handling device moving out of a truck bed in a forward mode according to embodiments of the present disclosure.

DETAILED DESCRIPTION

Figure 5:
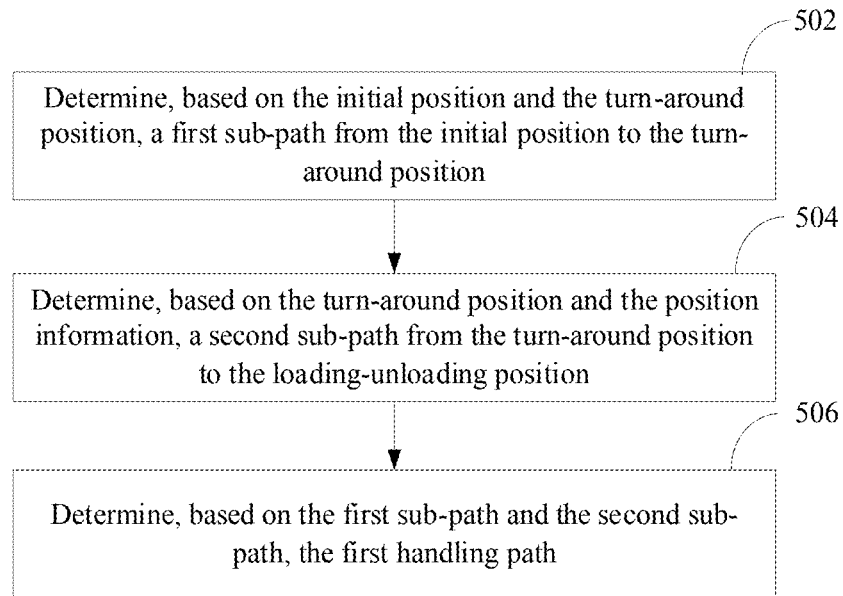
FIG. 5 is a schematic flowchart illustrating a determining process of a handling path according to embodiments of the present disclosure.

The technical solutions of the embodiments of the present disclosure will be clearly and fully described below in combination with drawings in the embodiments of the present disclosure. Apparently, the embodiments described herein are only some embodiments of the present disclosure rather than all embodiments. All other embodiments obtained by those skilled in the arts based on these embodiments of the present disclosure without carrying out creative work all fall within the scope of protection of present disclosure. It should be noted that the terms "including" and "having" and their variations in the embodiments and drawings of the present disclosure are meant to cover non-exclusive inclusion. For example, the processes, methods, systems, products or devices including a series of steps or units are not limited to the listed steps or units but optionally further include unlisted steps or units, or optionally further include other steps or units inherent to the processes, methods, products or devices.

A truck is a mainstream logistics transport vehicle in the world, which features large loading or unloading volume and high labor cost. The truck may include a trailer, a gated truck and a container truck and the like. The main difficulties of truck transportation include followings.

1. The service environment of the truck has the characteristics of highly dynamic change. The trucks are significantly different in specification, docking pose, truck bed height and internal conditions of truck bed; open or semi-open operation environments lead to varying temperature and humidity, light illumination and climate; the operation ground has complex conditions such as pit, slip and ramp etc.

2. The service scenarios of the truck have a pretty high requirement for operation accuracy. On the one hand, based on logistics cost and logistic safety, it is required to pack the truck bed as full as possible, without leaving any gap; on the other hand, based on land use cost, the platform space for the truck to dock is extremely limited.

3. The service scenarios of the truck require an extremely high working efficiency. The truck cannot stay on the platform for too long, and otherwise the logistics cost will be increased and the congestion of the loading-unloading platform appears.

At present, there are two major loading-unloading solutions for trucks. In the first solution, based on a connection device including chain(s) and/or guide rail(s), transfer of goods between a platform and a truck bed of truck can be realized. But the connection device cannot adapt to the environments of highly dynamic change. For example, when a truck docks with an angle error or its truck bed deforms, the connection device cannot place goods into the truck bed of the truck. Furthermore, if the connection device fails, it is difficult for the connection device to complete loading or unloading with the intervention of human. Moreover, the connection device occupies a large land area and thus is not applicable to small-sized platforms.

In the second solution, automatic loading or unloading is performed by a counterbalanced unmanned forklift. Although the counterbalanced unmanned forklift occupies a smaller land area than the connection device, the second solution has the following shortcomings.

(1) In order to facilitate automatic loading or unloading by the counterbalanced unmanned forklift, the counterbalanced unmanned forklift usually travels, in a backward mode, into a truck bed from outside the truck bed to perform goods loading or unloading operation. The backward mode refers to a direction in which a device body of the counterbalanced unmanned forklift points to a bearing assembly of the counterbalanced unmanned forklift. Because an obstacle-avoidance sensor of the counterbalanced unmanned forklift is usually disposed on a front end of the device body (i.e. at a side of the device body away from the bearing assembly), when the counterbalanced unmanned forklift travels in the backward mode, the counterbalanced unmanned forklift cannot sense an obstacle ahead in the traveling direction, leading to large travel risk.

In view of the above, an embodiment of the present disclosure provides a path planning method of a handling device, a handling device, and an electronic device, so as to load or unload goods by the handling device onto or from a truck bed, thereby improving the loading or unloading efficiency of the truck bed.

The path planning method of the handling device provided in the embodiments of the present disclosure can be applied to the application scenario shown in FIG. 1. As shown in FIG. 1, the application scenario can include a first environmental perception sensor 110, at least one handling device 120 (only one handling device shown as an example in the drawing), an electronic device 130, a boarding bridge 140, a platform 150 and a truck 160. The first environmental perception sensor 110 is configured to scan the platform 150 to obtain environmental point cloud data corresponding to the platform 150. When the truck 160 travels into the platform 150, the first environmental perception sensor 110 can generate environmental point cloud data including a truck bed 161 of the truck 160 and the platform 150.

The handling device 120 is configured to transport goods between the truck bed 161 and the platform 150, that is, handle goods in the truck bed 161 to a temporary goods storage area of the platform 150, or handle goods in the temporary goods storage area of the platform 150 into the truck bed 161, thereby loading or unloading goods to or from the truck bed 161. The handling device 120 has a size satisfying a condition of changing a travel direction in the truck bed. The handling device 120 may be provided with a controller (or a processor) to control the movement or goods pickup of the handling device.

The electronic device 130 is respectively connected with the first environmental perception sensor 110 and each handling device 120 to determine a handling path corresponding to each handling device 120 based on the environmental point cloud data and a to-be-processed task, and send the handling path to the corresponding handling device 120, such that the handling device 120 can complete loading or unloading task based on the handling path. The to-be-processed task includes loading or unloading goods to and from the truck bed 161. The boarding bridge 140 is configured to connect the platform 150 with the truck bed 161 of the truck 160, such that the handling device 120 can travel between the truck bed 161 and the platform 150 through the boarding bridge 140.

The handling device 120 may include a bearing assembly 121 and a device body 122. One end of the bearing assembly 121 is connected with the device body 122 and the other end of the bearing assembly 121 extends away from the device body 122. The handling device 120 can implement two travel modes, which are a forward mode and a backward mode respectively. A travel direction corresponding to the forward mode (referred to as forward direction hereunder) is a direction that the bearing assembly 121 points to the device body 122, and a travel direction corresponding to the backward mode (referred to as backward direction hereunder) is a direction that the device body 122 points to the bearing assembly 121.

The electronic device 130 may include but not limited to a personal computer or a laptop computer. The first environmental perception sensor 110 may include a laser radar. Optionally, there may be one, or two or three or more handling devices 120. Based on size, the handling devices can be divided into small-sized handling devices, medium-sized handling devices and large-sized handling devices, where the small-sized handling devices can rotate in the truck bed 161.

With reference to FIG. 2, it shows a schematic flowchart illustrating a path planning method of a handling device according to embodiments of the present disclosure. The path planning method of the handling device in FIG. 2 can be applied to the electronic device 130 in FIG. 1, and no limitation is made in the embodiments of the present disclosure.

As shown in FIG. 2, the path planning method of the handling device includes step 202 to step 204.

At step 202, based on position information of a target goods placement area in a truck bed and an initial position, a handling path corresponding to the target goods placement area is determined. The handling path includes a first handling path and the first handling path includes a turn-around position and a loading-unloading position corresponding to the target goods placement area.

The first handling path includes the turn-around position. It should be noted that the initial position corresponding to a target handling device may be a position of a boarding bridge or a current position of the target handling device. Particularly, the target handling device may be a handling device handling goods to the target goods placement area. For a situation that a to-be-processed task is unloading goods from the truck bed, the target goods placement area is an area storing goods in the truck bed, the position information of the target goods placement area includes pose information of the goods in the target goods placement area, the target handling device is a handling device handling the goods from the target goods placement area. For a situation that a to-be-processed task is loading goods to the truck bed, the initial position may also be a temporary goods storage area in a platform; the target handling device is a handling device handling goods from the initial position to the target goods placement area, the target goods placement area is any area storing goods in the truck bed. The turn-around position is a position where the target handling device rotates in situ. For example, the target handling device may firstly travel into the truck bed in a forward mode and rotate by an angle, for example, 180°, at the turn-around position, and then travel to the loading-unloading position corresponding to the target goods placement area in a backward mode. The loading-unloading position is a position where the target handling device can perform goods loading or unloading for the target goods placement area. As shown in FIG. 1, the bearing assembly 121 is a component used by the target handling device to pick up goods, and the bearing assembly 121 may be a fork or clamping assembly or the like. The electronic device can determine, based on the position information, an end point position of the target handling device, i.e., the loading-unloading position corresponding to the target goods placement area, take the initial position of the target handling device as a start point position, take a middle point position to be passed through as the turn-around position, and determine the first handling path running from the start point position through the middle point position to the end point position.

In an embodiment, based on the position information of the target goods placement area in the truck bed and the initial position corresponding to the target handling device, determining the handling path can include: based on the position information and a preset distance, determining, by the electronic device, the turn-around position corresponding to the target goods placement area, and based on the turn-around position, the initial position and the position information, determining the first handling path. It should be noted that with reference to FIG. 3B, the preset distance may include a first minimal distance L1 from a turn-around position A to a sidewall of the truck bed, and a second minimal distance L2 from the turn-around position A to a center point B of the target goods placement area in a sidewall extending direction. The target handling device should have a distance from both the sidewall of the truck bed and the target goods placement area during rotation, to avoid collision with the sidewall of the truck bed, and ensure loading or unloading operations after the rotation. It should be noted that the truck bed includes a left sidewall 301 and a right sidewall 302. Therefore, when the rotation direction of the target handling device 303 is clockwise direction, the first minimal distance L1 is a minimal distance from the turn-around position A to the left sidewall 301 of the truck bed. When the rotation direction of the target handling device 303 is counterclockwise direction, the first minimal distance L1 is a minimal distance from the turn-around position A to the right sidewall 302 of the truck bed. Optionally, the position information may include a coordinate of the center point B of the target goods placement area in a first reference coordinate system. Based on the coordinate of the center point of the target goods placement area in the first reference coordinate system, the first minimal distance L1 and the second minimal distance L2, the electronic device can determine a coordinate of the turn-around position in the first reference coordinate system. It should be noted that the second minimal distance L2 may be determined based on goods size, a size from a directional wheel to a device head, and a turning radius of the target handling device and the like. For example, the second minimal distance L2 can be calculated in the following formula:

$$L2 = L_{tray} + D_{safe} + L_{wheel} + R_{turn} * 2$$

In the above formula, Luray represents a pallet length, $D_{safe}$ represents a preset safety distance, $L_{wheel}$ represents a length from the directional wheel to the device head, and $R_{turn}$ represents a turning radius. The goods include a goods body and a pallet, and the goods body is placed on the pallet. In some embodiments, the first minimal distance L1 ranges from 13 cm to 17 cm. In some embodiments, the first minimal distance L1 is 13 cm, 14 cm, 15 cm, 16 cm or 17 cm. In some embodiments, the second minimal distance L2 ranges from 2.9 m to 3.1 m. In some embodiments, the second minimal distance L2 may be 2.9 m, 3 m or 3.1 m. For example, the pallet length Luray is 1.2 m, the preset safety distance $D_{safe}$ is 0.2 m, the distance $L_{wheel}$ from the directional wheel to the device head is 1.2 m, and the turning radius $R_{turn}$ of the target handling device is 0.2 m. In this case, the second minimal distance L2 can be obtained as 3 m. If the bearing assembly is a fork, the directional wheel can be disposed in the middle of the fork.

In the embodiment, the electronic device may firstly determine the turn-around position based on a space required for rotation of the target handling device, and then based on the turn-around position, the initial position and the position information, determine the first handling path, such that the target handling device, based on the first handling path, can travel in the forward mode, and then travel in the backward mode directly to the loading-unloading position corresponding to the target goods placement area.

It should be noted that the goods are usually arranged in a standard pose shown in FIG. 3A to FIG. 3E to maximize the space utilization rate of the truck bed, that is, to minimize the distance between the goods and the sidewall of the truck bed. The width of the device body of the counterbalanced unmanned forklift is usually greater than the goods width, and the sensor of the counterbalanced unmanned forklift is provided below the fork. Therefore, the counterbalanced unmanned forklift usually needs to transversely move to enable the fork to align with the goods, and further needs to perform pitching operation to expose the sensor under the fork. In contrast, the width of the device body of the handling device is generally less than or equal to the width of the goods, and the handling device can enable the bearing assembly to align with the goods indicated by the position information, without transversely moving. Further, the obstacle-avoidance sensor is usually disposed at the front end of the device body (i.e., at an end of the device body away from the bearing assembly) and therefore, the obstacle-avoidance sensor will not be blocked by the goods moved by the target handling device. As a result, the handling device does not need to perform pitching operation, thereby effectively improving the handling efficiency of the handling device.

At step 204, the handling path is sent to the target handling device, such that the target handling device, based on the first handling path, travels to the turn-around position in the forward mode, and rotates upon reaching the turn-around position, to enable the bearing assembly of the rotated target handling device to face toward the target goods placement area, and then travels in the backward mode to the loading-unloading position corresponding to the target goods placement area to perform goods loading or unloading operations.

It should be noted that when the to-be-processed task is unloading goods from the truck bed, the target handling device needs to place the goods in the target goods placement area onto the bearing assembly, that is, perform loading operation. When the to-be-processed task is loading goods onto the truck bed, the target handling device needs to unload the goods on the bearing assembly to the target goods placement area, that is, perform unloading operation. Taking unloading operation as example, the travel process of the target handling device is briefly described below. As shown in FIG. 3A, the target handling device travels into the truck bed in the forward mode, that is, travels into the truck bed with the device body ahead and the bearing assembly behind. As shown in FIG. 3B, the target handling device continues traveling toward the turn-around position and rotates upon reaching the turn-around position. As shown in FIG. 3C to FIG. 3D, after the target handling device rotates to be in place, the target handling device travels with the bearing assembly ahead and the device body behind toward the loading-unloading position. FIG. 3D shows a pose of the target handling device matching the position information, that is, shows a circumstance in which the target handling device continues traveling in the backward mode toward the loading-unloading position. For example, the target handling device can travel to the turn-around position from the boarding bridge of the truck bed along a path parallel to the sidewall of the truck bed, and then rotates 180° in situ, and travels in a straight-line backward mode to the loading-unloading position from the turn-around position. It can be understood that, as shown in FIG. 3B, in order to ensure the target handling device has sufficient handling space, the target handling device can rotate before reaching the turn-around position to extend the distance between the target handling device and the left sidewall 301, thereby avoiding collision with the left sidewall 301 during the rotation.

From the FIG. 3A to FIG. 3D, it can be known that, based on the path planned in the embodiments of the present disclosure, the target handling device can travel in the forward mode while away from the target goods placement area to ensure the safety of the travel process, and travel in the backward mode while close to the target goods placement area to enable the bearing assembly to face toward the target goods placement area, thereby ensuring the reliability of loading or unloading operations, including removing the problems of error and efficiency resulting from the actions (e.g., pitch and transversely move) of the bearing assembly. In the embodiment, the handling device travels in the forward mode into the truck bed, such that the bearing assembly and the goods on the bearing assembly will not block the field of view of the obstacle-avoidance sensor at the front end of the device body. The wide field of view of the obstacle-avoidance sensor helps improve the safety of loading of the truck bed, and stack the goods high in the truck bed, thereby improving the utilization rate of the truck bed.

In an embodiment, with continuous reference to FIG. 1, the handling device may include an unmanned pallet AGV (Automatic Guided Vehicle). The width of the device body of the unmanned pallet AGV is less than the width of most of the goods to be handled. Therefore, the unmanned pallet AGV can rotate in the truck bed, and no renovation is required for the boarding bridge. The unmanned pallet AGV has a large carrying capacity which basically satisfies the requirements of most truck for goods loading or unloading. The loaded device body of the unmanned pallet AGV has good trafficability, and can climb up various boarding bridges with load, and can cross a trench between the platform and the boarding bridge and a trench between the boarding bridge and the truck bed. The unmanned pallet AGV can pick up the carrier such as III-shaped pallet, cross-shaped pallets, wrapped film pallets, and material cages and the like which are commonly seen in the loading or unloading scenarios, leading to wide application. Furthermore, the unmanned pallet AGV has multiple modes such as automatic and manual and the like. When the automatic mode fails, the unmanned pallet AGV can be driven out in the manual mode, avoiding congestion of the platform and the truck bed and greatly reducing the failure risk. Due to small device body of the unmanned pallet AGV, at least two unmanned pallet AGVs can be allowed to simultaneously perform loading task or unloading task for the truck bed, that is, simultaneous loading or unloading can be carried out for multiple trucks, greatly increasing the completion efficiency of the loading task or unloading task for the truck bed. For example, two unmanned pallet AGVs can complete loading for one full truck bed within 7 to 10 minutes. With reference to FIG. 4A, it shows a schematic diagram illustrating a handling path planned by an electronic device, where two unmanned pallet AGVs have non-overlapped handling paths, and can perform loading task or unloading task for the truck bed of the truck at the same time.

In some embodiments, the bearing assembly is a fork. The directional wheel of the handling device is in the middle of the fork. Compared with the disposal of the directional wheel at an end of the fork away from the device body, the overall length of the handling device is shortened and the rotation radius is also reduced. Therefore, the unmanned pallet AGV can perform pose adjustment with large amplitude in a small truck bed, thereby effectively solving the problems of package breakage and collision of the goods with the sidewall of the truck bed and the like. In some embodiments, the unmanned pallet AGV has a size of 1632*815*1650 mm and a weight of 460 kg and can handle an object of 2000 kg at a speed of 1.4 m/s and can, with the object loaded, climb up a slope below 3.5° and cross a 3 cm trench. When the size of the loaded goods is within 1.2 m*1 m, a channel width required for the unmanned pallet AGV to rotate in situ is less than 2.2 m. A minimal width of the bed of the truck is generally 2.35 m, and thus the unmanned pallet AGV can rotate in situ within the truck bed.

In this embodiment, by planning the path of firstly traveling in the forward mode and then rotating and then traveling in the backward mode, in cooperation with, for example, the handling device of the unmanned pallet AGV, accurate loading or unloading operation can be carried out without bringing the bearing assembly to act by a lateral movable component and a pitching component, greatly improving the loading or unloading efficiency for the truck bed.

In an embodiment, the handling path can further include a second handling path for leaving the truck bed from the loading-unloading position. After the target handling device performs goods loading or unloading operation, the target handling device can travel out of the truck bed in the forward mode based on the second handling path. It should be noted that, when goods are to be handled into the truck bed, with reference to FIG. 3E and FIG. 4B, the target handling device 303 moves out of the truck bed in the forward mode and travels to the temporary goods storage area for goods storage, to place the goods picked up from the target goods placement area into the temporary goods storage area C, or pick up next goods to be handled into the truck bed from the temporary goods storage area C. Therefore, after the target handling device performs goods loading or unloading operation at the temporary goods storage area C, the target handling device can travel into the truck bed in the forward mode, and thus can sense the environment ahead in the travel direction, greatly improving the safety. In contrast, in order to help the counterbalanced unmanned forklift to perform automatic loading or unloading, the counterbalanced unmanned forklift usually travels in the backward mode into the truck bed from outside the truck bed to perform goods loading or unloading operation. The backward mode refers to a direction in which the device body of the counterbalanced unmanned forklift points to the bearing assembly of the counterbalanced unmanned forklift. Because the obstacle-avoidance sensor of the counterbalanced unmanned forklift is usually disposed at the front end of the device body (i.e., at a side of the device body away from the bearing assembly), when the counterbalanced unmanned forklift travels in the backward mode, it cannot sense an obstacle ahead in the traveling direction, leading to large travel risk.

In some embodiments, the target handling device is provided with a second environmental perception sensor. In this case, based on the second handling path, traveling out of the truck bed in the forward mode may include: obtaining, by the target handling device, point cloud data obtained by the second environmental perception sensor through scanning, generating an obstacle map based on the point cloud data, adjusting the second handling path based on the obstacle map to obtain an updated second handling path, and moving out of the truck bed based on the updated second handling path. It should be noted that the target handling device may include the second environmental perception sensor and a positioning sensor. The target handling device may determine a current position of the target handling device based on the positioning sensor, and determine a position corresponding to the second environmental perception sensor based on the current position of the target handling device. For example, the current position of the target handling device can be determined as the position corresponding to the second environmental perception sensor, and the target handling device can construct the obstacle map based on the position corresponding to the second environmental perception sensor and the point cloud data obtained by the second environmental perception sensor through scanning. In some embodiments, the second environmental perception sensor includes but not limited to a laser radar, and the positioning sensor includes but not limited to a laser radar, a wheel odometer, and a camera. The target handling device constructs the obstacle map by multi-sensor fusion method, and based on the obstacle map, plans the second handling path with the highest efficiency in which the target handling device travels out of the truck bed in the forward mode, such that the target handling device can travel out of the truck bed based on the second handling path and unload the goods to the temporary goods storage area or pick up another goods from the temporary goods storage area.

In the embodiments of the present disclosure, loading or unloading operations are performed by the handling device in the truck bed, such that the target handling device can rotate before traveling to the loading-unloading position based on the determined handling path in the truck bed, and then continue traveling to the loading-unloading position to directly pick up or unload goods, without adjusting the position of the bearing assembly by a lateral movable component, thereby improving the loading or unloading efficiency of the handling device in the truck bed. Due to small rotation radius of the handling device, the handling device can smoothly perform direction-changing operation in the truck bed without collision with the truck bed. Furthermore, due to small device body of the handling device, the handling device will not crush a boarding bridge or a truck bed floor, and no renovation is required for the boarding bridge, leading to wide application scope and high reliability.

With reference to FIG. 5, it shows a schematic flowchart illustrating a determination process of a handling path according to embodiments of the present disclosure. As shown in FIG. 5, based on the turn-around position, the initial position and the position information, determining the first handling path may include step 502 to step 506.

At step 502, based on the initial position and the turn-around position, a first sub-path from the initial position to the turn-around position is determined.

At step 504, based on the turn-around position and the position information, a second sub-path from the turn-around position to the loading-unloading position is determined.

It should be noted that the travel mode in which the target handling device travels from the initial position to the turn-around position is different from the travel mode in which the target handling device travels from the turn-around position to the loading-unloading position. In this embodiment, with the initial position as a start point position and the turn-around position as an end point position, the first sub-path can be determined based on a preset path algorithm; next, with the turn-around position as a start point position and the loading-unloading position as an end point position, the second sub-path can be determined based on preset path planning algorithm. In this way, the first handling path can be divided into the first sub-path and the second sub-path, and the first sub-path and the second sub-path arc respectively planned, thereby reducing the planning difficulty of the first handling path including the turn-around position. Furthermore, the requirement for the handling path of firstly traveling in the forward mode and then traveling in the backward mode can be satisfied. In some embodiments, the preset path algorithm may include but not limited to A*(A-star) algorithm, Dijkstra algorithm, optimal search algorithm or Dubins path planning algorithm or the like.

At step 506, based on the first sub-path and the second sub-path, the first handling path is determined.

The first handling path may include the first sub-path from the initial position corresponding to the target handling device to the turn-around position, and the second sub-path from the turn-around position to the loading-unloading position. In an embodiment, based on the turn-around position, the initial position and the position information, determining the first handling path may further include: based on the second sub-path and the position information, determining, by the electronic device, a turn-around pose. The target handling device rotates upon reaching the turn-around position to enable the pose of the rotated target handling device to be consistent with the turn-around pose.

The first handling path further includes the turn-around pose corresponding to the turn-around position, and the turn-around pose is a pose of the target handling device having rotated at the turn-around position. It should be noted that the pose of the target handling device mainly refers to a direction (or orientation) of the bearing assembly of the target handling device. For example, in order to ensure the goods are placed in the target goods placement area or the goods in the target goods placement area are picked up to the bearing assembly, it should be guaranteed that the target handling device should perform fork insertion straightly, namely, when the target handling device reaches the loading-unloading position, the pose of the target handling device should be consistent with the pose indicated by the position information, which is equivalent to that the pose of the target handling device at the end point position of the second sub-path should exactly face toward the goods at the position indicated by the position information. Accordingly, the turn-around pose is equivalent to a pose of the target handling device at the start point position of the second sub-path. The electronic device can determine the turn-around pose based on the second sub-path and the position information. It can be understood that when the target handling device travels to the turn-around position based on the first sub-path, if the pose of the target handling device is inconsistent with the turn-around pose, the target handling device may rotate in situ, such that the pose of the rotated target handling device is consistent with the turn-around pose while the target handling device is maintained at the turn-around position. When the target handling device reaches the loading-unloading position based on the second sub-path, the pose of the target handling device is matched with the pose indicated by the position information, the reliability of the loading or unloading operations can be guaranteed. In this embodiment, the turn-around pose is determined based on the second sub-path and the position information, it can be guaranteed that the target handling device can travel to the loading-unloading position corresponding to the target goods placement area based on the first sub-path, the second sub-path and the turn-around pose, and the pose of the target handling device at the loading-unloading position is consistent with the pose indicated by the position information.

In this embodiment, the electronic device determines the first sub-path based on the initial position and the turn-around position, and determines the second sub-path based on the turn-around position and the position information. By dividing the first handling path into the first sub-path and the second sub-path, a handling path for traveling in different directions can be planned. The target handling device can travel based on the handling path planned this way, and can directly perform loading or unloading operations upon reaching the target goods placement area, without adjusting the lateral movable component and the like, thereby improving the handling efficiency of the target handling device.

Figure 6:
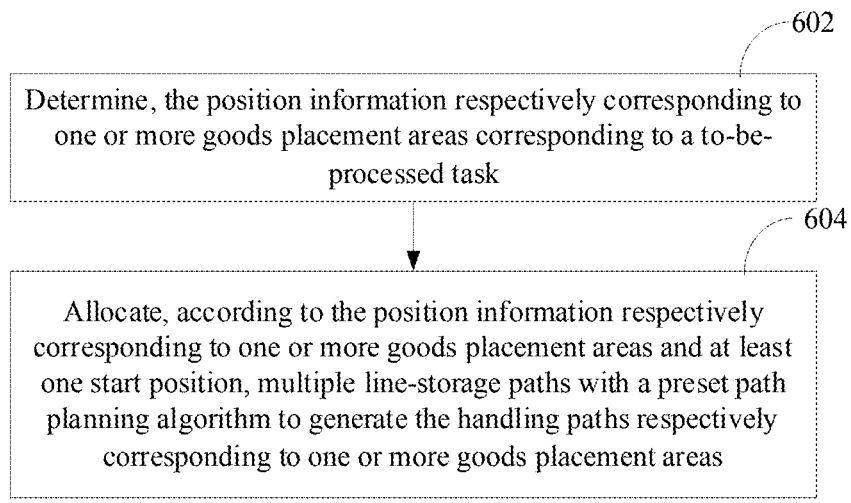
FIG. 6 is a schematic flowchart illustrating a global path planning process according to embodiments of the present disclosure.

With reference to FIG. 6, it shows a schematic flowchart illustrating a global path planning process according to embodiments of the present disclosure. As shown in FIG. 6, the step of determining the first handling path corresponding to the goods placement area based on the position information of the target goods placement area in the truck bed and the initial position may include step 602 to step 604.

At step 602, the position information respectively corresponding to one or more goods placement areas corresponding to a to-be-processed task is determined.

Figure 7:
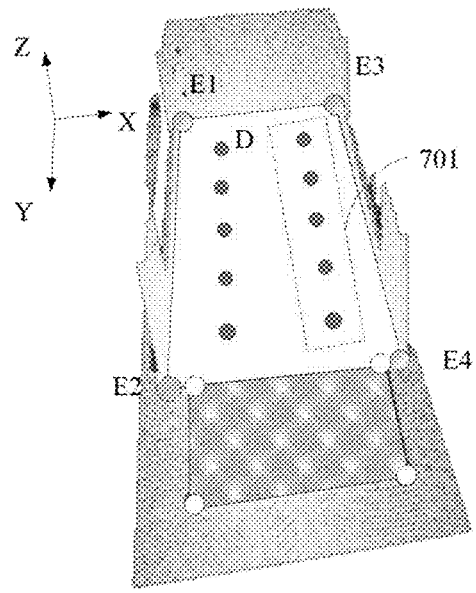
FIG. 7 is a schematic diagram illustrating three-dimensional point cloud data corresponding to a truck bed according to embodiments of the present disclosure.

One or more goods placement areas corresponding to the to-be-processed task include the target goods placement area. It should be noted that the truck bed usually includes multiple goods placement areas for placing multiple pieces of goods. When the to-be-processed task is unloading goods from the truck bed, the area occupied by each piece of goods in the truck bed can be taken as one goods placement area. When the to-be-processed task is loading goods to the truck bed, the goods placement areas in the truck bed can be reasonably planned based on the size of the goods and the size of the truck bed, so as to pack the truck bed as fully as possible, thereby reducing the logistics cost and increasing the logistics safety. As shown in FIG. 7, it shows a center position D of multiple planned goods placement areas.

At step 604, according to the position information respectively corresponding to one or more goods placement areas and at least one start position, multiple line-storage paths are allocated based on a preset path planning algorithm, to generate the handling paths respectively corresponding to one or more goods placement areas.

At least one start position includes the initial position corresponding to the target handling device. Further, at a same time, the path nodes corresponding to different goods placement areas belong to different line-storage paths. For example, the truck bed usually includes multiple goods placement areas arranged in multiple columns, and the path nodes corresponding to a same column of goods placement areas belong to one line-storage path. With reference to FIG. 7, it shows two line-storage paths 701. It should be noted that after the handling device travels to the loading-unloading position, and completes loading or unloading operations, the handling device needs to travel out of the truck bed from the loading-unloading position. When one handling device travels out of the truck bed along a first line-storage path and another handling device travels into the truck bed along the first line-storage path at the same time, the handling device to travel into the truck bed needs to wait outside the truck bed until the previous handling device leaves the truck bed. Apparently, the handling device to travel into the truck bed has to wait for a long time. In this embodiment, when the electronic device plans the handling paths corresponding to the goods placement areas, the electronic device assigns the line-storage path entirely to the goods placement areas, avoiding the case that two handling devices correspond to a same line-storage path at the same time, thereby improving the handling efficiency.

In an embodiment, the step of sending the handling path to the target handling device includes: sending a handling path corresponding to a first goods placement area to a first handling device, and sending a handling path corresponding to a second goods placement area to a second handling device. The target handling device may include the first handling device and the second handling device, and the handling path corresponding to the target goods placement area includes the handling path corresponding to the first goods placement area and the handling path corresponding to the second goods placement area. It should be noted that, with continuous reference to FIG. 4A, it can be known from the above embodiment that the electronic device can determine the handling path corresponding to each goods placement area, and allocate the handling path corresponding to each goods placement area to a different handling device. In this case, multiple handling devices can complete loading task or unloading task for the same truck bed, thereby improving the loading or unloading efficiency for the truck bed. It can be understood that, more than two handling devices can be used to complete loading or unloading task for a same truck bed, further improving the loading or unloading efficiency for the truck bed. Illustratively, when the first handling device leaves the truck bed, a third handling device can enter the truck bed, that is, when the first handling device moves from the truck bed to the temporary goods storage area of the platform or from the temporary goods storage area of the platform to the truck bed, the third handling device can enter the truck bed to perform loading or unloading operation, further improving the loading or unloading efficiency for the truck bed.

Figure 8:
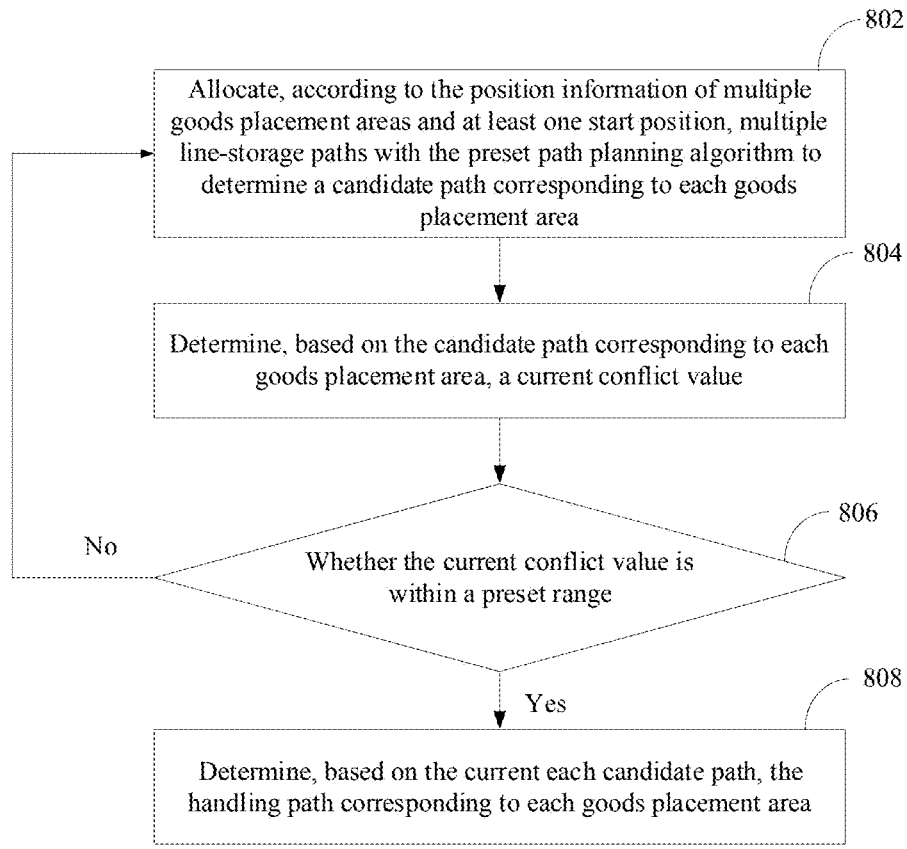
FIG. 8 is a schematic flowchart illustrating a handling path generation process according to embodiments of the present disclosure.

With reference to FIG. 8, it shows a schematic flowchart illustrating a handling path generation process according to embodiments of the present disclosure. As shown in FIG. 8, the step of allocating multiple line-storage paths with the preset path planning algorithm, according to the position information respectively corresponding to one or more goods placement areas and at least one start position may include step 802 to step 808.

At step 802, according to the position information of multiple goods placement areas and at least one start position, multiple line-storage paths are allocated based on the preset path planning algorithm, to determine a candidate path corresponding to each goods placement area.

It should be noted that the initial position may be a position of the boarding bridge, or a current position of the target handling device. When the to-be-processed task is loading goods to the truck bed, the initial position may also be a position of the temporary goods storage area of the goods in the platform. The preset path planning algorithm may be used to plan a path from the start point position to the end point position. The electronic device can perform random combination on one or more goods placement areas and at least one start position, and determine the end point position of the path based on the position information of the goods placement areas, and determine the start point position of the path based on the initial position of the goods placement area combination, and perform path planning on the paths including multiple start point positions and end point positions corresponding to the start point positions based on the preset path planning algorithm, to determine a planned path corresponding to each goods placement area.

At step 804, based on the candidate path corresponding to each goods placement area, a current conflict value is determined.

At step 806, whether the current conflict value is within a preset range is determined. If not, the step 802 to step 806 are performed; if yes, step 808 is performed.

At step 808, based on the current respective candidate paths, the handling path corresponding to each goods placement area is determined.

The conflict value is related to the overlapping path segments of respective candidate paths at a same time. The preset range may be used to determine whether the number of overlapping path segments of multiple candidate paths corresponding to the conflict value at a same time satisfies a requirement. It can be known from the above embodiments that the candidate path corresponding to each goods placement area is planned independently, and the conflict value is calculated to determine whether multiple candidate paths have overlapping path segments, and determine the number of the overlapping path segments. If the current conflict value is within the preset range, the number of the overlapping path segments is considered as less than or equal to a target number, and the current each candidate path can be determined as the handling path corresponding to each goods placement area. If the current conflict value is not within the preset range, the number of the overlapping path segments is considered as greater than the target number, and it is required to re-perform random combination on one or more goods placement areas and at least one start position, based on the preset path planning algorithm, re-plan the path of each goods placement area, until the conflict value is within the preset range.

In some embodiments, determining the current conflict value based on the candidate path corresponding to each goods placement area includes: performing paired combination on the candidate paths corresponding to the goods placement areas to obtain multiple candidate path groups; determining a number of overlapping paths corresponding to a current candidate path group, and selecting a next candidate path group as a new current candidate path group and re-performing the step of determining the number of overlapping paths corresponding to the current candidate path group until no next candidate path group is present; calculating a sum value of the numbers of the overlapping paths corresponding to the respective candidate path groups, and determining the sum value as the current conflict value. It should be noted that paired combination can be performed on the candidate paths corresponding to the goods placement areas to obtain multiple candidate path groups. For example, if the candidate paths include L3, L4, L5 and L6, the candidate path groups may include L3 and L4, L3 and L5, L3 and L6, L4 and L5, L4 and L6, and L5 and L6, totaling six groups. By calculating the number of the overlapping paths of the candidate path groups and calculating the sum value of numbers of the overlapping paths of multiple candidate path groups, the conflict value of multiple candidate paths can be determined. By comparing the conflict value with the preset range, whether to re-plan the paths can be determined.

In some embodiments, the candidate path L3 is a handling path from the first handling device to a first loading-unloading area, the candidate path L4 is a handling path from the first handling device to a second loading-unloading area, the candidate path L5 is a handling path from the second handling device to the first loading-unloading area, and the candidate path L6 is a handling path from the second handling device to the second loading-unloading area. The correspondence of the candidate paths L3, L4, L5 and L6, the handling devices and the loading-unloading areas is shown in the Table below.

|  | First loading-unloading area | Second loading-unloading area |
| --- | --- | --- |
| First handling device | L3 | L4 |
| Second handling device | L5 | L6 |

In the candidate path groups of L3 and L5, and L4 and L6, two handling devices reach a same loading-unloading area at a same time, and the two candidate path groups each have one overlapping path segment. In the candidate path groups of L3 and L4, and L5 and L6, the two candidate path groups each have one overlapping path segment at a same time; and the two candidate path groups of L3 and L6, and L4 and L5 each do not have overlapping path. Therefore, the sum value of the numbers of the overlapping path segments corresponding to the candidate path groups is 4, and it can be determined that the conflict value of the candidate paths planned currently is 4.

In an embodiment, the preset path planning algorithm is Dubins path planning algorithm. Before the current conflict value is determined, allocating multiple line-storage paths with the preset path planning algorithm according to the position information respectively corresponding to one or more goods placement areas and at least one start position may further include: performing, by the electronic device, interpolation processing on the candidate path corresponding to each goods placement area, and based on each interpolation-processed candidate path and the size of the device body of the target handling device, determining a surface-shaped travel area corresponding to each candidate path.

The step of determining the current conflict value based on the candidate path corresponding to each goods placement area includes: determining, by the electronic device, the current conflict value based on the surface-shaped travel area corresponding to each candidate path. The candidate path corresponding to each goods placement area and generated based on Dubins path planning algorithm is one non-continuous dotted curve. One-dimensional linear interpolation operation is performed on each candidate path to transform each candidate path into a smooth curve used to show the travel path of the unmanned forklift. Since the handling device has a size, in order to ensure the handling device will not collide with other handling device at any position, the surface-shaped travel area corresponding to each candidate path is generated based on each interpolation-processed candidate path and the size of the device body of the target handling device, and whether each surface-shaped travel area has an overlapping path segment is determined. Thus, based on the determined candidate path, the handling device can be prevented from collision at any position, thereby increasing the reliability of the goods handling.

In an embodiment, determining the current conflict value based on the surface-shaped travel area corresponding to each candidate path includes: performing paired combination on the surface-shaped travel areas corresponding to the candidate paths to obtain multiple surface-shaped travel area groups; determining an overlapping path segment in each surface-shaped travel area group in the multiple surface-shaped travel area groups; calculating a sum value of the overlapping path segments of multiple surface-shaped travel area groups; and determining the sum value as the current conflict value.

In an embodiment, after it is determined that the current conflict value is within the preset range, the path planning method of the handling device may include: if determining that each candidate path has an overlapping path segment at same time based on the current conflict value, determining, by the electronic device, a travel sequence of the overlapping path segment in each target candidate path, where the target candidate path is a candidate path having an overlapping path segment with other candidate path at a same time. It should be noted that the handling path corresponding to each goods placement area further includes a travel sequence of the overlapping path segments. In the embodiment, the electronic device considers, in a unified way, all handling paths required for completing the to-be-processed task and determines all overlapping paths to be bypassed, and in a case of presence of overlapping path segments, determines a travel sequence corresponding to the overlapping path segments. In this way, real-time traffic control can be carried out, thereby realizing no deadlock globally.

In the embodiment, the electronic device can consider, in a unified way, all handling paths required for completing the to-be-processed task and determine each candidate path for completing the to-be-processed task, where the number of the overlapping path segments of the candidate paths satisfies the requirement. The waiting time of the handling devices can be significantly reduced, thereby improving the loading or unloading efficiency of the handling devices for the truck bed.

In the embodiment, the electronic device can bind one column of goods placement areas in the truck bed as one line-storage path, and at a same time, a same line-storage path only corresponds to a handling path of one goods placement area to be first processed in the column of goods placement areas. That is, it can be guaranteed that there is only one handling device entering one line-storage path of the truck bed at any time, reducing the long waiting time of two handling devices traveling toward a same line-storage path and hence improving the handling efficiency for the truck bed.

As mentioned in the above embodiment, when goods are to be loaded into the truck bed, the goods placement areas in the truck bed can be reasonably planned based on the size of the goods and the size of the truck bed, so as to pack the truck bed as full as possible. One goods placement area planning process will be provided below to realize reasonable planning on the goods placement areas in the truck bed, so as to improve the space utilization rate of the truck bed.

Figure 9:
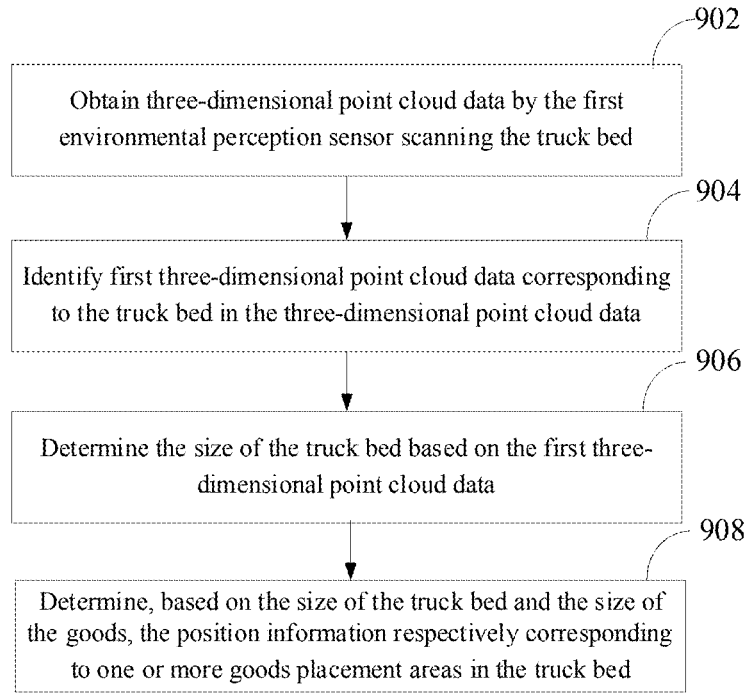
FIG. 9 is a schematic flowchart illustrating a goods placement area planning process according to embodiments of the present disclosure.

With reference to FIG. 9, it shows a schematic flowchart illustrating a goods placement area planning process according to embodiments of the present disclosure. As shown in FIG. 9, the step of determining the position information respectively corresponding to one or more goods placement areas corresponding to a to-be-processed task may include step 902 to step 908.

At step 902, the truck bed is scanned by the first environmental perception sensor to obtain three-dimensional point cloud data.

It should be noted that the first environmental perception sensor can be configured to scan the platform. When the truck travels into the platform, the first environmental perception sensor can scan the truck bed of the truck and hence can collect point cloud data corresponding to the truck bed.

At step 904, first three-dimensional point cloud data corresponding to the truck bed in the three-dimensional point cloud data is identified.

It should be noted that, after the electronic device obtains the three-dimensional point cloud data collected by the first environmental perception sensor, the electronic device performs Region of Interest (ROI) extraction on the three-dimensional point cloud data to obtain the first three-dimensional point cloud data in the ROI region. In the embodiment, before determining the size of the truck bed, the electronic device can first perform ROI extraction to extract the first three-dimensional point cloud data corresponding to the truck bed, avoiding the influence of other point cloud data in the three-dimensional point cloud data on subsequent processing.

At step 906, the size of the truck bed is determined based on the first three-dimensional point cloud data.

In an embodiment, the step of determining the size of the truck bed based on the first three-dimensional point cloud data may include: extracting, by the electronic device, a planar image data of the truck bed of the truck, identifying truck bed feature points of the truck bed based on the planar image data, and determining the size of the truck bed based on the truck bed feature points. As shown in FIG. 7, the truck bed feature points may include a left far point E1, a left near point E2, a right far point E3 and a right near point E4. The left far point E1 is an intersection point of a back surface of the truck bed and a left sidewall of the truck bed, the left near point E2 is an intersection point of a door of the truck bed and the left sidewall of the truck bed, the right far point E3 is an intersection point of the back surface of the truck bed and a right sidewall of the truck bed, and the right near point E4 is an intersection point of the door of the truck bed and the right sidewall of the truck bed.

In an embodiment, before the planar image data of the truck bed of the truck is extracted, the step of determining the position information respectively corresponding to one or more goods placement areas corresponding to the to-be-processed task may further include: extracting, by the electronic device, point cloud data corresponding to a floor of the truck bed and point cloud data corresponding to the sidewalls of the truck bed from the first three-dimensional point cloud data, and adjusting the first three-dimensional point cloud data based on the point cloud data corresponding to the floor of the truck bed and the point cloud data corresponding to the sidewalls of the truck bed to obtain second three-dimensional point cloud data as the planar image data of the truck bed. The point cloud data corresponding to the floor of the truck bed in the second three-dimensional point cloud data is in a first reference plane of a first reference coordinate system, and the point cloud data corresponding to the sidewalls of the truck bed in the second three-dimensional point cloud data is parallel to a first axis of the first reference coordinate system. The first reference coordinate system includes a first axis Y, a second axis X and a third axis Z. The first axis Y, the second axis X and the third axis Z are perpendicular to each other in pairs. The first axis Y is in the first reference plane and the third axis Z is perpendicular to the first reference plane. In some embodiments, the step of extracting, by the electronic device, the point cloud data corresponding to the floor of the truck bed from the first three-dimensional point cloud data, includes: from the first three-dimensional point cloud data, extracting, by the electronic device, the cloud point data corresponding to the floor of the truck bed based on normal vector segmentation method, and extracting, by the electronic device, the point cloud data corresponding to the sidewalls of the truck bed based on Random Sample Consensus (RANSAC) algorithm. It should be noted that when the first environmental perception sensor is mounted with an orientation of overlooking the ground, the normal vector of the point cloud data corresponding to the floor of the truck bed can be determined as (0, 0, 1), that is, Y=0, X=0 and Z=1. The RANSAC algorithm is an algorithm in which mathematics model parameters of data are calculated based on a set of sample data containing anomaly data to obtain valid sample data. Since three points can determine one plane, three points may be selected randomly in the RANSAC algorithm to construct one plane, and a correctness of the plane can be evaluated by calculating the number of points in the point cloud falling on the plane, thereby realizing plane extraction and segmentation.

In an embodiment, the step of extracting the planar image data of the truck bed of the truck may include: intercepting the point cloud data corresponding to the door of the truck bed from the second three-dimensional point cloud data, obtaining a two-dimensional projection image of the point cloud data corresponding to the door of the truck bed on a second reference plane, and identifying the planar image data corresponding to the sidewalls of the truck bed and the back surface of the truck bed from the second three-dimensional point cloud data. The step of identifying the truck bed feature points of the truck bed based on the planar image data and determining the size of the truck bed based on the truck bed feature points may include: based on the second-dimensional projection image, determining a first edge straight line equation, a second edge straight line equation and a third edge straight line equation corresponding to the second-dimensional projection image, obtaining a first intersection point of the first edge straight line equation and the second edge straight line equation, and a second intersection point of the second edge straight line equation and the third edge straight line equation, determining a first plane fitting equation corresponding to the sidewalls of the truck bed based on the planar image data corresponding to the sidewalls of the truck bed, and determining a second plane fitting equation corresponding to the back surface of the truck bed based on the planar image data corresponding to the back surface of the truck bed, determining coordinate values of the left far point E1, the left near point E2, the right far point E3 and the right near point E4 in the first reference coordinate system based on the first intersection point, the second intersection point, the first plane fitting equation and the second plane fitting equation, and determining the size of the truck bed based on the coordinate values of the left far point E1, the left near point E2, the right far point E3 and the right near point E4 in the first reference coordinate system. The second reference plane is perpendicular to the first reference plane and perpendicular to the first axis Y.

It should be noted that the planar image data includes the two-dimensional projection image and the planar image data corresponding to the sidewalls of the truck bed. In the embodiment, a first non-zero element is searched from the center of the two-dimensional projection image in a positive direction of the first axis X, a negative direction of the first axis X and a negative direction of the third axis Z respectively so as to obtain the first edge straight line equation, the second edge straight line equation and the third edge straight line equation; a second-axis coordinate and a third-axis coordinate of each truck bed feature point under the first reference coordinate system can be obtained based on the first intersection point and the second intersection point; the first-axis coordinates corresponding to the left near point and the right near point in the second three-dimensional point cloud data can be determined based on the first plane fitting equation; the first-axis coordinates corresponding to the left far point and the right far point in the second three-dimensional point cloud data can be determined based on the second plane fitting equation. Therefore, the coordinate values of the left far point E1, the left near point E2, the right far point E3 and the right near point E4 in the first reference coordinate system can be obtained, so as to determine the size of the truck bed.

At step 908, based on the size of the truck bed and the size of the goods, the position information respectively corresponding to one or more goods placement areas in the truck bed is determined.

In an embodiment, the size of the truck bed includes a distance between the left sidewall and the right sidewall. Based on the size of the truck bed and the size of the goods, determining the position information respectively corresponding to one or more goods placement areas in the truck bed may include: based on the distance between the left sidewall and the right sidewall and the size of the goods, determining three-dimensional position information respectively corresponding to one or more goods placement areas in the truck bed, and based on a heading angle of the truck and the three-dimensional position information respectively corresponding to one or more goods placement areas in the truck bed, determining two-dimensional position information respectively corresponding to one or more goods placement areas in the truck bed. In some embodiments, the three-dimensional position information includes a coordinate of a center point D of the goods placement areas in the first reference coordinate system. The two-dimensional position information includes a coordinate of the center point D of the goods placement areas in the second reference coordinate system. The second reference coordinate system is a two-dimensional coordinate system. The electronic device can determine the handling path corresponding to each goods placement area under the two-dimensional coordinate system.

In the embodiment, based on the size of the truck bed and the size of the goods, the goods placement areas in the truck bed can be planned. In the embodiment, by collecting the three-dimensional point cloud data corresponding to the truck bed by using the environmental perception sensors, the size of the truck bed can be accurately determined, and based on the size of the truck bed and the size of the goods, accurate goods placement area planning is performed on the space of the truck bed. The placement of the goods based on the planned goods placement areas can narrow the gap between the goods arranged in the truck bed of the truck, thereby improving the space utilization rate of the truck bed of the truck.

Figure 10:
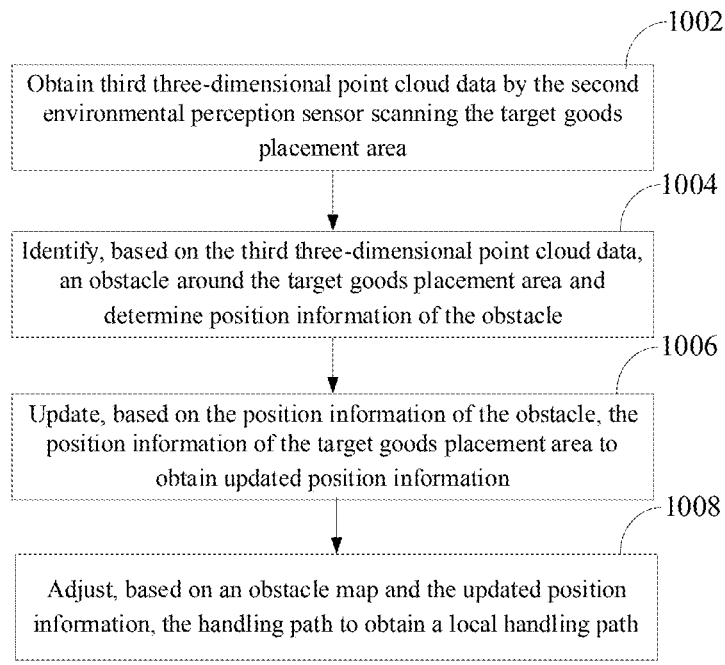
FIG. 10 is a schematic flowchart illustrating a local path planning process according to embodiments of the present disclosure.

With reference to FIG. 10, it shows a schematic flowchart illustrating a local path planning process according to embodiments of the present disclosure. As shown in FIG. 10, the local path planning process can be applied to the target handling device. The local path planning process may include step 1002 to step 1008.

At step 1002, the target goods placement area is scanned by the second environmental perception sensor to obtain third three-dimensional point cloud data.

It should be noted that the second environmental perception sensor may include a laser radar and a camera. After the target handling device enters the truck bed, the target handling device can determine the position information of the target goods placement area based on the handling path sent by the electronic device. When the target handling device climbs onto the boarding bridge, the target handling device can scan the target goods placement area by using the second environmental perception sensor to obtain the third three-dimensional point cloud data.

In an embodiment, when the to-be-processed task is a loading task for the truck bed, the handling path may further include position information of the temporary goods storage area. After the target handling device receives the handling path corresponding to the target goods placement area, the local path planning process further includes: traveling, by the target handling device, to the temporary goods storage area based on the position information of the temporary goods storage area, and picking up the goods in the temporary goods storage area onto the bearing assembly. It should be noted that the temporary goods storage area is an area for goods storage, and the target handling device needs to handle the goods in the temporary goods storage area into the truck bed.

The goods pickup mode in the temporary goods storage area may include a smart goods pickup mode and a fixed goods pickup mode. The smart goods pickup mode includes, by using the second environmental perception sensor such as a laser radar and a camera on the handling device, performing mapping and feature extraction on the goods to be picked up, calculating a pose of the goods relative to the handling device, generating a third handling path based on the pose, where the target handling device is able to complete the pickup of the goods based on the third handling path. The fixed goods pickup mode is a mode with a fixed pickup position, and the target handling device goes to the same temporary goods storage area each time to pick up goods, without performing path planning.

At step 1004, based on the third three-dimensional point cloud data, an obstacle around the target goods placement area is identified and position information of the obstacle is determined.

At step 1006, based on the position information of the obstacle, the position information of the target goods placement area is updated to obtain updated position information.

It should be noted that, the target handling device can identify an obstacle from the third three-dimensional point cloud data, such as a piece of goods placed around the target goods placement area, where the position information of the obstacle includes a coordinate of the obstacle under a third reference coordinate system. The third reference coordinate system is the target handling device's own coordinate system. Accordingly, the position information of the target goods placement area may include the coordinate of the center point of the target goods placement area under the third reference coordinate system. Specifically, the first-axis coordinate of the center point of the target goods placement area under the third reference coordinate system can be calculated based on the position of the obstacle of the target goods placement area in the first axis direction of the third reference coordinate system; the second-axis coordinate of the center point of the target goods placement area under the third reference coordinate system can be calculated based on the position of the obstacle in the target goods placement area in the second axis direction of the third reference coordinate system; the updated position information of the target goods placement area can be obtained based on an angle difference between a heading angle of the target handling device and a heading angle of the truck. For example, the electronic device determines a third plane fitting equation of the sidewalls of the truck bed in the third reference coordinate system based on the third three-dimensional point cloud data, determines the angle difference between the heading angle of the target handling device and the heading angle of the truck based on the third plane fitting equation, and determines an angle required for the target handling device to rotate based on the angle difference. In the embodiment, by obtaining the updated position information based on the target handling device's own coordinate system, more accurate position information of the target goods placement area can be obtained, thereby improving the accuracy of the target handling device performing loading or unloading operation.

At step 1008, based on an obstacle map and the updated position information, the handling path is adjusted to obtain a local handling path.

In some embodiments, the obstacle map is point cloud data obtained by the target handling device performing real-time dynamic mapping according to the third three-dimensional point cloud data collected by the second environmental perception sensor through scanning on the basis of a static point cloud map sent by the electronic device.

In an embodiment, the construction flow of the obstacle map may include the following steps:

1. With no truck parked in the platform, based on the three-dimensional point cloud data collected by the second environmental perception sensor on the target handling device, a first three-dimensional image M0 corresponding to the platform is constructed.

2. Based on the first three-dimensional image M0 and the point cloud data collected by the first environmental perception sensor, a pose of the first environmental perception sensor under the world coordinate system is calibrated.

3. With a truck parked in the platform, the three-dimensional point cloud data M1 corresponding to the truck is output by the first environmental perception sensor.

4. The electronic device splices the three-dimensional point cloud data M1 corresponding to the truck and the first three-dimensional image M0 to obtain a second three-dimensional image M2, and transmitting the second three-dimensional image M2 into the target handling device based on the communication mode such as enhanced communication abstraction layer (ecal).

It should be noted that, as mentioned in the above embodiment, the position information includes the coordinate of the center point of the goods placement areas under the second reference coordinate system. Since the first environmental perception sensor may be mounted with left-right yaw, the coordinate of the center point of the goods placement areas under the second reference system can be transformed into a coordinate under a fourth reference coordinate system, and the coordinate of the center point of the goods placement areas under the fourth reference coordinate system can be projected to the second three-dimensional image M2 as a third three-dimensional image M3, and then the third three-dimensional image M3 is sent to the target handling device. The fourth reference coordinate system is a coordinate system obtained after the yaw of the first environmental perception sensor is corrected based on the calibrated pose of the first environmental perception sensor under the world coordinate system. The second reference coordinate system, for example, is a two-dimensional plane coordinate system corresponding to a travel surface of the target handling device. The fourth reference coordinate system is determined based on the pose of the first environmental perception sensor under the world coordinate system, for example, it is a three-dimensional coordinate system determined with the first environmental perception sensor as origin.

5. With the third three-dimensional image M3 as a basic map, the target handling device performs dynamic mapping on the basis of the third three-dimensional image M3 to obtain the obstacle map.

In the embodiment, after the target handling device enters the truck bed, the second environmental perception sensor scans the target goods placement area based on the position information sent by the electronic device, and calculates, based on its own coordinate system of the target handling device, more accurate position information of the target goods placement area, namely, the updated position information. The target handling device outputs the obstacle map for the surrounding of the target handling device when operating based on the multi-sensor fusion method in combination with real-time map of the mapping module, and based on the updated position information and the obstacle map, dynamically plans information such as a running path from the target handling device to the target placement area, a speed, a rudder angle and the like.

Figure 11:
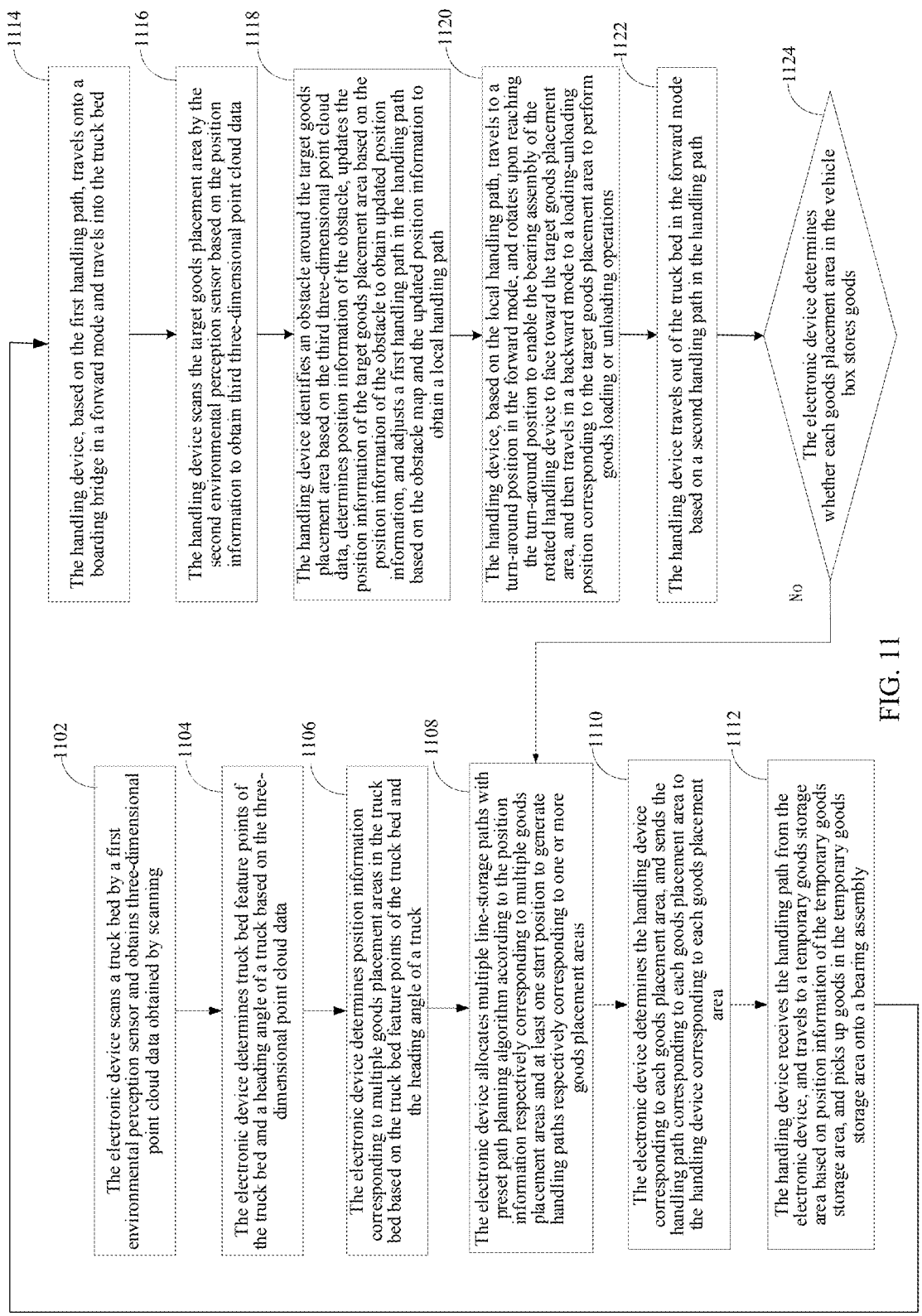
FIG. 11 is a schematic flowchart illustrating a goods loading process according to embodiments of the present disclosure.

With reference to FIG. 11, it shows a schematic flowchart illustrating a goods loading process according to embodiments of the present disclosure. The goods loading process can be applied to a path planning system. The path planning system may include an electronic device and two handling devices. As shown in FIG. 11, the goods loading process can include step 1102 to step 1124.

At step 1102, the electronic device scans a truck bed by a first environmental perception sensor to obtain three-dimensional point cloud data.

At step 1104, the electronic device determines truck bed feature points of the truck bed and a heading angle of a truck based on the three-dimensional point cloud data.

At step 1106, the electronic device determines position information corresponding to multiple goods placement areas in the truck bed based on the truck bed feature points of the truck bed and the heading angle of the truck.

At step 1108, the electronic device allocates multiple line-storage paths, based on preset path planning algorithm, according to the position information respectively corresponding to multiple goods placement areas and at least one start position to generate handling paths respectively corresponding to one or more goods placement areas.

At step 1110, the electronic device determines the handling device corresponding to each goods placement area, and sends the handling path corresponding to each goods placement area to the handling device corresponding to each goods placement area.

At step 1112, for each handling device, the handling device receives the handling path from the electronic device, and travels to a temporary goods storage area based on position information of the temporary goods storage area, and picks up goods in the temporary goods storage area onto a bearing assembly of the handling device. The handling path includes the position information of the temporary goods storage area, and at least includes a first handling path from the temporary goods storage area to a loading-unloading position corresponding to the target goods placement area.

At step 1114, based on the first handling path, the handling device travels onto a boarding bridge in a forward mode and travels into the truck bed.

At step 1116, the handling device scans the target goods placement area by the second environmental perception sensor based on the position information to obtain third three-dimensional point cloud data.

At step 1118, the handling device identifies an obstacle around the target goods placement area based on the third three-dimensional point cloud data, determines position information of the obstacle, updates the position information of the target goods placement area based on the position information of the obstacle to obtain updated position information, and adjusts a first handling path in the handling path based on the obstacle map and the updated position information to obtain a local handling path.

At step 1120, the handling device, based on the local handling path, travels to a turn-around position in the forward mode, and rotates upon reaching the turn-around position to enable the bearing assembly of the rotated handling device to face toward the target goods placement area, and then travels in a backward mode to a loading-unloading position corresponding to the target goods placement area to perform goods loading or unloading operations.

At step 1122, the handling device travels out of the truck bed in the forward mode based on a second handling path in the handling path.

At step 1124, the electronic device determines whether each goods placement area in the truck bed stores goods; if not, step 1108 is performed.

Figure 12:
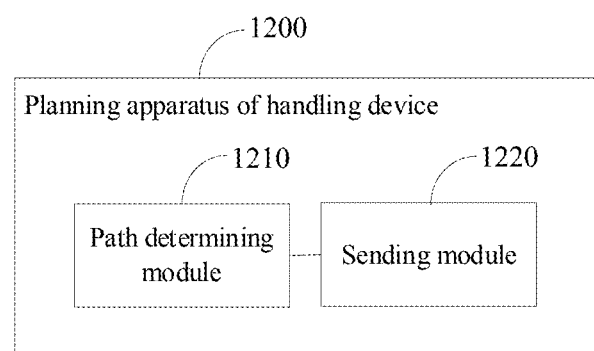
FIG. 12 is a structural schematic diagram illustrating a path planning apparatus of a handling device according to embodiments of the present disclosure.

With reference to FIG. 12, it shows a structural schematic diagram illustrating a path planning apparatus of a handling device according to embodiments of the present disclosure. The apparatus can be applied to the electronic device shown in FIG. 1, which is not limited herein. As shown in FIG. 12, the path planning apparatus 1200 of the handling device may include: a path determining module 1210 and a sending module 1220. The path determining module 1210 is configured to determine, based on position information of a target goods placement area in a truck bed and an initial position, a handling path corresponding to the target goods placement area. The handling path at least includes a first handling path, and the first handling path includes a turn-around position and a loading-unloading position corresponding to the target goods placement area. The sending module 1220 is configured to send the handling path to a target handling device, such that the target handling device, based on the first handling path, travels to the turn-around position in a forward mode, and rotates at the turn-around position, to enable a bearing assembly of the rotated target handling device to face toward the target goods placement area, and then travels in a backward mode to the loading-unloading position to perform goods loading or unloading operations. The travel direction of the forward mode is a direction that the bearing assembly of the target handling device points to the device body, and the travel direction of the backward mode is a direction that the device body points to the bearing assembly.

Figure 13:
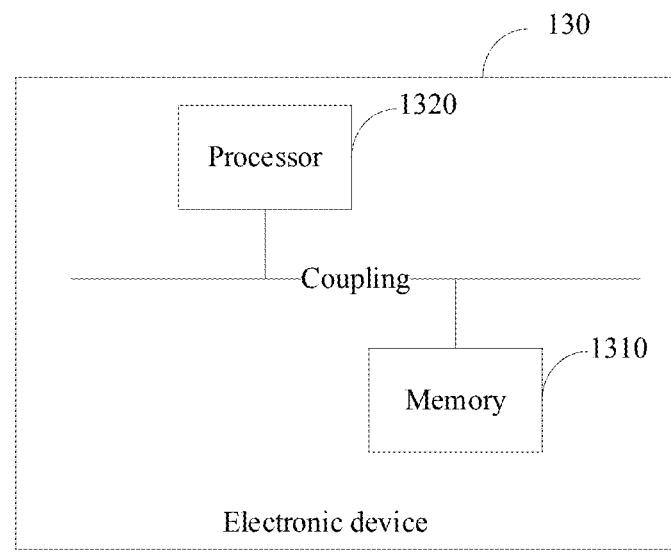
FIG. 13 is a structural schematic diagram illustrating an electronic device according to embodiments of the present disclosure.

With reference to FIG. 13, it shows a structural schematic diagram illustrating an electronic device according to embodiments of the present disclosure. As shown in FIG. 13, the electronic device 130 includes a memory 1310 storing executable program codes; a processor 1320 coupled with the memory 1310; where the processor 1320 invokes the executable program codes stored in the memory 1310 to perform any one path planning method of a handling device in the embodiments of the present disclosure.

With reference to FIG. 1, an embodiment of the present disclosure provides a handling device 120, including a bearing assembly 121, a device body 122 and a controller. One end of the bearing assembly 121 is connected with the device body 122, and the other end of the bearing assembly 121 extends away from the device body 122. The controller is configured to: receive a handling path. The handling path includes a first handling path, and the first handling path includes a turn-around position and a loading-unloading position corresponding to a target goods storage area in a truck bed. After receiving the handling path, the controller is further configured to: based on the first handling path, control the handling device 120 to travel to the turn-around position in a forward mode, rotate at the turn-around position to enable the bearing assembly 121 of the rotated handling device 120 to face toward the target goods placement area, and then control the handling device 120 to travel, in a backward mode, to the loading-unloading position to perform goods loading or unloading operations; where a travel direction of the backward mode is a direction that the device body 122 points to the bearing assembly 121, and a travel direction of the forward mode is opposite to the travel direction of the backward mode.

An embodiment of the present disclosure provides a computer readable storage medium, storing computer programs, where the computer programs are executed by a processor to perform any one path planning method of a handling device in the embodiments of the present disclosure.

It should be understood that "one embodiment" or "an embodiment" mentioned throughout the specification means that specific features, structures or characteristics related to the embodiments are included in at least one embodiment.

Therefore, "in one embodiment" or "in an embodiment" appearing everywhere in the entire specification does not necessarily refer to a same embodiment. Furthermore, these specific features, structures or characteristics can be combined in one or more embodiments in any proper manner. Those skilled in the arts also should understand that the embodiments described in the specification are all optional embodiments, and the actions or modules involved are not necessarily required by the present disclosure. In the various embodiments of the present disclosure, it should be understood that the sequence numbers of each process above do not mean a necessary sequence for performing the process. The execution sequence of each process should be determined based on its functions and internal logistics and does not constitute any limitation to the execution process of the embodiments of the present disclosure.

The units described as separate members may be or not be physically separated, and the members displayed as units may be or not be physical units, i.e., may be located in one place, or may be distributed to a plurality of network units. Part or all of the units may be selected according to actual requirements to implement the objectives of the solutions in the embodiments. Furthermore, various functional units in various embodiments of the present disclosure may be integrated into one processing unit, or may be present physically separately, or two or more units thereof may be integrated into one unit. The above integrated units may be implemented in the form of hardware or in the form of software function units.

The above integrated units, if implemented in the form of software functional units and sold or used as independent products, may be stored in one computer-available memory. Based on such understanding, the technical scheme of the present disclosure essentially or a part contributing to the prior art or all or part of the technical scheme may be embodied in the form of a software product, the software product is stored in one memory, and includes several instructions for enabling a computer device (such as a personal computer, a server or a network device, and specifically a processor of the computer device) to execute all or part of the steps of the methods disclosed by the embodiments of the present disclosure.

The above are detailed descriptions about the path planning method and apparatus of the handling device and the electronic device in the embodiments of the present disclosure. Specific embodiments are used herein to set forth the principles and implementations of the present disclosure, and the descriptions of the above embodiments are merely meant to help understand the method and its core ideas of the present disclosure. Furthermore, persons of ordinary skills in the arts can made changes to the specific implementations and application scope based on the idea of the present disclosure. In conclusion, the contents of the present disclosure shall not be understood as limiting of the present disclosure.

The invention claimed is:

1. A path planning method of a handling device, comprising:
   based on position information of a target goods placement area in a truck bed and an initial position, determining a handling path corresponding to the target goods placement area, wherein the handling path comprises a first handling path, and the first handling path comprises a turn-around position and a loading-unloading position corresponding to the target goods placement area; and
   sending the handling path to a target handling device, such that the target handling device, based on the first handling path, travels to the turn-around position in a forward mode, and rotates at the turn-around position, to enable a bearing assembly of the rotated target handling device to face toward the target goods placement area, and then travels, in a backward mode, to the loading-unloading position to perform goods loading or unloading operations;
   wherein a travel direction of the backward mode is a direction that a device body of the target handling device points to the bearing assembly of the target handling device, and a travel direction of the forward mode is opposite to the travel direction of the backward mode.

2. The method of claim 1, wherein the handling path further comprises a second handling path for leaving the truck bed from the loading-unloading position; wherein the target handling device is further configured to, after performing goods loading or unloading operations, travel out of the truck bed in the forward mode based on the second handling path.

3. The method of claim 2, wherein the target handling device is provided with a second environmental perception sensor, the method further comprises:
   obtaining point cloud data generated by the second environmental perception sensor through scanning, and generating an obstacle map based on the point cloud data; and
   adjusting, based on the obstacle map, the second handling path to obtain an updated second handling path, such that the target handling device moves out of the truck bed based on the updated second handling path.

4. The method of claim 1, wherein based on the position information of the target goods placement area in the truck bed and the initial position, determining the handling path corresponding to the target goods placement area comprises:
   determining, based on the position information and a preset distance, a turn-around position corresponding to the target goods placement area; and
   determining, based on the turn-around position, the initial position and the position information, the first handling path corresponding to the target goods placement area.

5. The method of claim 4, wherein determining, based on the turn-around position, the initial position and the position information, the first handling path corresponding to the target goods placement area comprises:
   determining, based on the initial position and the turn-around position, a first sub-path from the initial position to the turn-around position;
   determining, based on the turn-around position and the position information, a second sub-path from the turn-around position to the loading-unloading position; and
   determining, based on the first sub-path and the second sub-path, the first handling path corresponding to the target goods placement area.

6. The method of claim 5, wherein determining, based on the turn-around position, the initial position and the position information, the first handling path corresponding to the target goods placement area further comprises:
   determining, based on the second sub-path and the position information, a turn-around pose of the target handling device,
   wherein the turn-around pose represents a pose of the target handling device having rotated at the turn-around position, and when the target handling device with the turn-around pose reaches the loading-unloading position along the second sub-path from the turn-around position, the bearing assembly of the target handling device exactly faces toward goods in the target goods placement area.

7. The method of claim 1, wherein the truck bed comprises multiple goods placement areas arranged in multiple columns, and path nodes corresponding to a same column of goods placement areas belongs to one line-storage path; determining, based on the position information of the target goods placement area in the truck bed and the initial position, the handling path corresponding to the target goods placement area comprises:
  determining the position information respectively corresponding to one or more goods placement areas corresponding to a to-be-processed task, and the one or more goods placement areas corresponding to the to-be-processed task comprises the target goods placement area; and
  according to the position information respectively corresponding to the one or more goods placement areas and at least one start position, allocating multiple line-storage paths based on a preset path planning algorithm to generate one or more handling paths respectively corresponding to the one or more goods placement areas; wherein at a same time, the path nodes corresponding to different goods placement areas belong to different line-storage paths, and the at least one start position comprises the initial position.

8. The method of claim 7, wherein according to the position information respectively corresponding to the one or more goods placement areas and at least one start position, allocating multiple line-storage paths based on the preset path planning algorithm comprises:
  allocating multiple line-storage paths with the preset path planning algorithm according to the position information of multiple goods placement areas and at least one start position, and determining a candidate path corresponding to each goods placement area;
  determining, based on the candidate path corresponding to each goods placement area, a current conflict value, wherein the conflict value is positively correlated with a number of overlapping path segments of respective candidate paths at a same time;
  if the current conflict value is not within a preset range, re-performing steps of allocating multiple line-storage paths with the preset path planning algorithm according to the position information of multiple goods placement areas and at least one start position, determining a candidate path corresponding to each goods placement area, and determining a current conflict value based on each candidate path, until the current conflict value is within the preset range; and
  determining, based on the current each candidate path, the handling path corresponding to each goods placement area.

9. The method of claim 1, further comprising:
  determining, based on three-dimensional point cloud data generated by a first environmental perception sensor scanning the truck bed, a size of the truck bed; and
  determining, based on the size of the truck bed and a size of the goods, the position information respectively corresponding to one or more goods placement areas in the truck bed.

10. The method of claim 9, wherein determining, based on the three-dimensional point cloud data generated by the first environmental perception sensor scanning the truck bed, the size of the truck bed comprises:
  identifying first three-dimensional point cloud data corresponding to the truck bed in the three-dimensional point cloud data;
  extracting, based on the first three-dimensional point cloud data, planar image data of the truck bed;
  identifying, based on the planar image data, truck bed feature points of the truck bed; and
  determining, based on the truck bed feature points, the size of the truck bed.

11. The method of claim 10, wherein extracting, based on the first three-dimensional point cloud data, the planar image data of the truck bed comprises:
  extracting point cloud data corresponding to a floor of the truck bed and point cloud data corresponding to sidewalls of the truck bed from the first three-dimensional point cloud data; and
  adjusting, based on the point cloud data corresponding to the floor of the truck bed and the point cloud data corresponding to the sidewalls of the truck bed, the first three-dimensional point cloud data to obtain second three-dimensional point cloud data as the planar image data of the truck bed;
  wherein the point cloud data corresponding to the floor of the truck bed in the second three-dimensional point cloud data is in a first reference plane of a first reference coordinate system, and the point cloud data corresponding to the sidewalls of the truck bed in the second three-dimensional point cloud data is parallel to a first axis of the first reference coordinate system; wherein the first reference coordinate system comprises the first axis, a second axis and a third axis, the first axis, the second axis and the third axis are perpendicular to each other in pairs, and the first axis is located in the first reference plane and the third axis is perpendicular to the first reference plane.

12. The method of claim 1, further comprising:
  performing, by a second environmental perception sensor on the target handling device, mapping and feature extraction on the goods to be picked up by the target handling device;
  calculating a pose of the goods relative to the target handling device; and
  based on the pose, generating a third handling path, wherein the target handling device is able to complete pickup of the goods based on the third handling path.

13. The method of claim 1, wherein,
  the target handling device moves out of the truck bed in the forward mode and travels to a temporary goods storage area for goods storage,
  the target handling device places the goods picked up from the target goods placement area in the temporary goods storage area, or
  the target handling device picks up next goods to be handled to the truck bed from the temporary goods storage area.

14. The method of claim 1, further comprising:
  when no truck is parked in a platform, constructing a first three-dimensional image corresponding to the platform based on three-dimensional point cloud data collected by a second environmental perception sensor on the target handling device;
  calibrating, based on the first three-dimensional image and point cloud data collected by a first environmental perception sensor, a pose of the first environmental perception sensor under a world coordinate system;
  when the truck comprising the truck bed is parked in the platform, obtaining three-dimensional point cloud data corresponding to the truck and output by the first environmental perception sensor; and splicing the three-dimensional point cloud data corresponding to the truck and the first three-dimensional image to obtain a second three-dimensional image, and transmitting the second three-dimensional image to the target handling device;

wherein the target handling device is configured to:
establish a reference coordinate system based on the calibrated pose of the first environmental perception sensor under the world coordinate system,
project a coordinate of a center point of the goods placement areas in the truck bed under the reference coordinate system to the second three-dimensional image to obtain a third three-dimensional image, and
with the third three-dimensional image as basic map, perform dynamic mapping based on the third three-dimensional image to obtain an obstacle map.

15. The method of claim 1, wherein,
when a to-be-processed task is a loading task for the truck bed, the handling path further comprises position information of a temporary goods storage area for goods storage,
the target handling device travels to the temporary goods storage area based on the position information of the temporary goods storage area, and picks up the goods in the temporary goods storage area onto the bearing assembly.

16. The method of claim 1, wherein the handling path further comprises a fourth handling path corresponding to a temporary goods storage area, and the method further comprises:
determining, based on position information of the temporary goods storage area, the fourth handling path;
adjusting, based on position information of an obstacle around the target goods placement area, the first handling path in the handling path to obtain a local handling path; and
sending the handling path comprising the fourth handling path and the local handling path to the target handling device, such that
the target handling device travels to the temporary goods storage area based on the fourth handling path to load or unload the goods in the temporary goods storage area, and
the target handling device, based on the local handling path, travels to the turn-around position in the forward mode, and rotates upon reaching the turn-around position to enable the bearing assembly of the rotated target handling device to face toward the target goods placement area, and then travels to the loading-unloading position corresponding to the target goods placement area in the backward mode to perform loading or unloading operations.

17. The method of claim 1, wherein after the handling path is sent to the target handling device, the method further comprises:
identifying, based on three-dimensional point cloud data obtained by scanning the target goods placement area using a second environmental perception sensor on the target handling device, an obstacle around the target goods placement area and determining the position information of the obstacle;
updating, based on the position information of the obstacle, the position information of the target goods placement area to obtain updated position information based on a coordinate system of the target handling device; and,
adjusting, based on the position information of the obstacle and the updated position information, the handling path, such that the target handling device travels to the loading-unloading position based on the adjusted handling path.

18. The method of claim 1, wherein the target handling device comprises a first handling device and a second handling device, and the handling path corresponding to the target goods placement area comprises a handling path corresponding to a first goods placement area and a handling path corresponding to a second goods placement area; sending the handling path to the target handling device comprises:
sending the handling path corresponding to the first goods placement area to the first handling device, and
sending the handling path corresponding to the second goods placement area to the second handling device.

19. A handling device, comprising a bearing assembly, a device body and a controller, wherein,
one end of the bearing assembly is connected with the device body, and the other end of the bearing assembly extends away from the device body, and
the controller is configured to receive a handling path, wherein the handling path comprises a first handling path, and the first handling path comprises a turn-around position and a loading-unloading position corresponding to a target goods placement area in a truck bed;
wherein after receiving the handling path, the controller is further configured to: based on the first handling path, control the handling device to travel to the turn-around position in a forward mode, rotate at the turn-around position to enable the bearing assembly of the rotated handling device to face toward the target goods placement area, and then control the handling device to travel, in a backward mode, to the loading-unloading position to perform goods loading or unloading operations; and
wherein a travel direction of the backward mode is a direction in which the device body points to the bearing assembly, and a travel direction of the forward mode is opposite to the travel direction of the backward mode.

20. An electronic device, comprising a memory and a processor, wherein the memory stores computer programs and the computer programs are executed by the processor to cause the processor to perform operations comprising:
based on position information of a target goods placement area in a truck bed and an initial position, determining a handling path corresponding to the target goods placement area, wherein the handling path comprises a first handling path, and the first handling path comprises a turn-around position and a loading-unloading position corresponding to the target goods placement area; and
sending the handling path to a target handling device, such that the target handling device, based on the first handling path, travels to the turn-around position in a forward mode, and rotates at the turn-around position, to enable a bearing assembly of the rotated target handling device to face toward the target goods placement area, and then travels, in a backward mode, to the loading-unloading position to perform goods loading or unloading operations;

wherein a travel direction of the backward mode is a direction that a device body of the target handling device points to the bearing assembly of the target handling device, and a travel direction of the forward mode is opposite to the travel direction of the backward mode.

\* \* \* \* \*